United States Patent
Govindassamy et al.

(10) Patent No.: US 10,237,829 B1
(45) Date of Patent: *Mar. 19, 2019

(54) METHOD AND APPARATUS FOR PROXIMITY SENSOR CONTROL

(71) Applicant: MBIT WIRELESS, INC., Irvine, CA (US)

(72) Inventors: Sivakumar Govindassamy, Irvine, CA (US); Prakash Neelakandan Malliga, Chennai (IN); Kalyankumar Reddy, Kadapa (IN); Ilavarasan Kuppan, Puducherry (IN)

(73) Assignee: MBIT WIRELESS, INC., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/153,136

(22) Filed: Oct. 5, 2018

Related U.S. Application Data

(63) Continuation of application No. 15/470,054, filed on Mar. 27, 2017.

(51) Int. Cl.
*H04B 1/38* (2015.01)
*H04W 52/02* (2009.01)

(52) U.S. Cl.
CPC ... *H04W 52/0258* (2013.01); *H04W 52/0235* (2013.01); *H04W 52/0274* (2013.01)

(58) Field of Classification Search
CPC . H04W 24/02; H04W 4/005; H04W 28/0221; H04W 28/0289; H04W 28/06; H04W 52/0251; H04W 76/02; H04W 76/045; H04W 28/0236; H04W 4/001; H04W 52/0229; H04W 12/06; H04W 28/0231; H04W 4/02; H04W 4/18; H04W 4/20; H04W 4/22
USPC .......................................................... 455/574
See application file for complete search history.

(56) References Cited

U.S. PATENT DOCUMENTS

| 2005/0114714 A1* | 5/2005 | Albulet | G06F 1/3203 713/300 |
| 2007/0176906 A1* | 8/2007 | Warren | G06F 3/04883 345/173 |
| 2009/0270030 A1* | 10/2009 | Jia | H04B 1/1615 455/39 |

FOREIGN PATENT DOCUMENTS

WO     2009070415 A1    6/2009

\* cited by examiner

*Primary Examiner* — Ajibola A Akinyemi
(74) *Attorney, Agent, or Firm* — Lerner, David, Littenberg, Krumholz & Mentlik, LLP

(57) ABSTRACT

Proximity sensors are used in many user devices to detect a user's proximity to it. The proximity detection may be used to control the transmit power of a user device to ensure that the transmit power is in the allowed power range. There are other uses of proximity detection. A proximity sensor, like many other electronic devices, needs power supply for its normal operation. Many user devices are battery operated and therefore reducing power consumption of a user device is essential. A method and apparatus are disclosed that may enable reduced power consumption for a proximity sensor. The disclosed method may be applied to any user device that employs a proximity sensor.

18 Claims, 13 Drawing Sheets

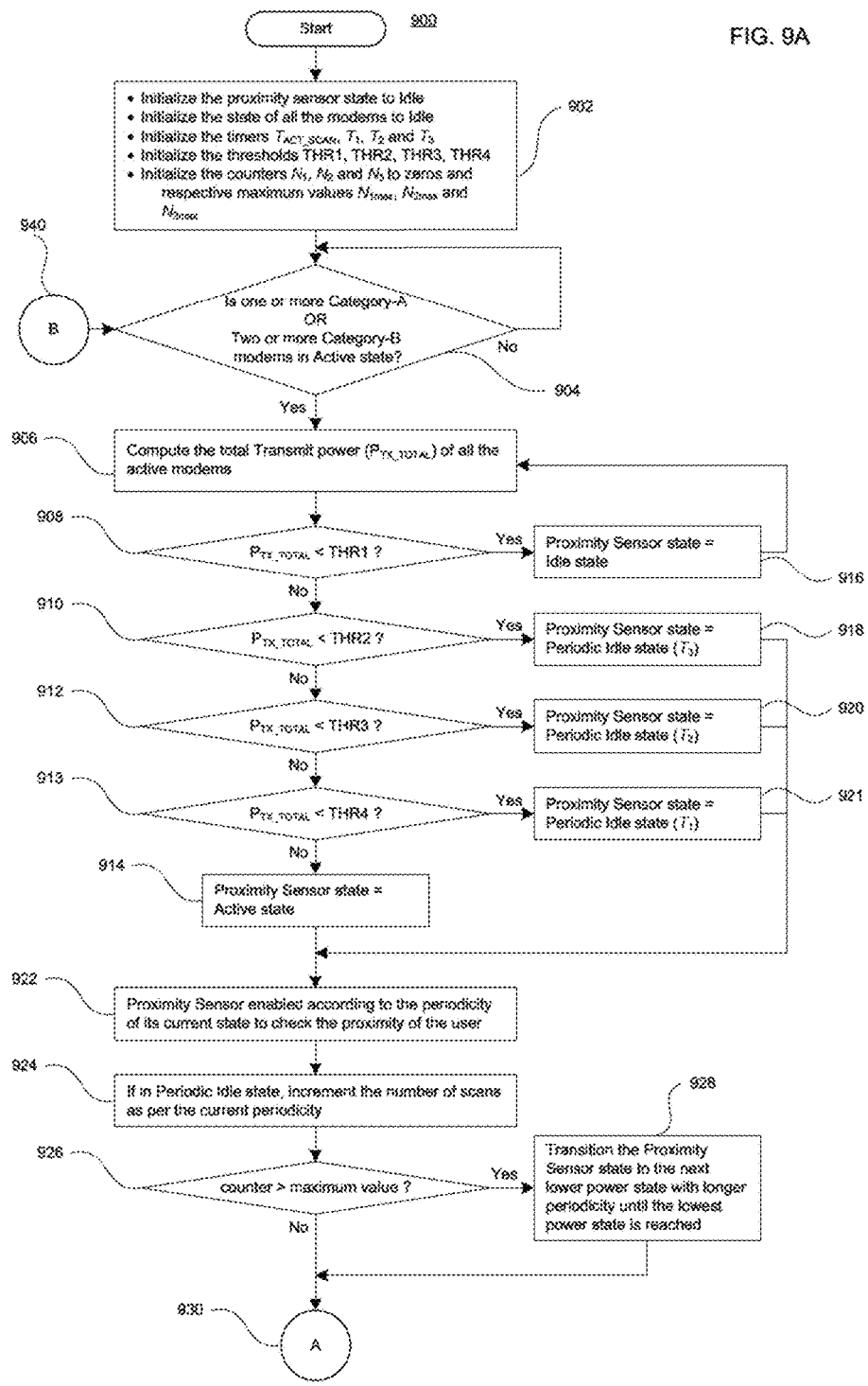

METHOD AND APPARATUS FOR PROXIMITY SENSOR CONTROL

The present application is a continuation of U.S. patent application Ser. No. 15/470,054 filed on Mar. 27, 2017, the disclosure of which is incorporated herein by reference.

BACKGROUND

Proximity sensing technology has become popular across a wide range of industries, especially in consumer electronics. The largest applications for proximity sensors within consumer electronics are smartphones, tablets and other mobile devices. These devices are referred to herein as user devices.

The proximity sensing is done for several purposes, some of which may include to: (1) reduce display power consumption by turning it off when holding a user device near a human body, (2) disable the touch screen to avoid inadvertent touches by a human body when holding a user device near it and (3) reduce transmit power of a user device to reduce the Specific Absorption Rate (SAR). The SAR is a measure of the rate at which energy is absorbed by a human body when exposed to a Radio Frequency (RF) electromagnetic field. The Federal Communications Commission (FCC) and other regulatory agencies require electronic devices to reduce the RF transmit power of a user device when in close proximity to a human body to keep SAR at or below allowed levels.

A proximity sensor, like many other electronic devices, needs power supply for its normal operation. Many user devices are battery operated and therefore reducing its power consumption is important.

The capabilities of a user device may vary widely depending on the type of device. For example, a user device may have a capability to communicate with a mobile wireless network based on different radio access technologies (RAT) such as Long Term Evolution (LTE) from the $3^{rd}$ Generation Partnership Project (3GPP), or Code Division Multiple Access (CDMA) from $3^{rd}$ Generation Partnership Project-2 (3GPP2), or Wideband CDMA (WCDMA) from 3GPP, or Global System for Mobile Communications (GSM) from 3GPP, etc. The mobile wireless networks based on these technologies are referred to herein as Wireless Wide-Area Networks (WWAN). A user device may include a WWAN modem for one or more RATs. For example, a user device may include modems for 3GPP LTE and 3GPP WCDMA RATs. A high level block diagram of a portion of a generic user device 100 with WWAN support is shown in FIG. 1. It comprises a display 102, a keypad 104, an RF and baseband (BB) receiver 106 for WWAN, a Radio Frequency (RF) and BB transmitter 108 for WWAN. The RF and BB receiver 106 and RF and BB transmitter 108 for WWAN are together referred to herein as WWAN modem 110. The user device 100 also comprises a Central Processing Unit (CPU) 112 for overall control of the device. The user device 100 also comprises the proximity sensor 114, the Proximity Sensor Control Unit 116, and the SAR Control Unit 118. The Proximity Sensor Control Unit may perform proximity detection by controlling the proximity sensor, making measurements and outputting proximity detection results. The SAR Control Unit accepts the inputs from Proximity Sensor Control Unit and determines whether any reduction in RF transmit power is required.

A user device may support communication over a Wireless Local Area Networks (WLAN). One of the most commonly used WLAN technology is based on the IEEE 802.11 standards and it is also commonly known as Wi-Fi. The terms WLAN and Wi-Fi may be used interchangeably herein. A high level block diagram of a portion of a generic user device 200 with WLAN support is shown in FIG. 2. The user device 200 comprises an RF and BB receiver 202 for WLAN, an RF and BB transmitter 204 for WLAN. The RF and BB receiver 202 and RF and BB transmitter 204 for WLAN are together referred to herein as WLAN modem 206. The user device 200 also comprises a CPU 208 for overall control of the device. The maximum RF transmit power for Wi-Fi may be up to 20 dBm as per FCC regulations. It may vary depending on regional regulatory requirements.

A user device may support wireless link over a Bluetooth protocol for communicating with other devices in a Personal Area Network (PAN). A high level block diagram of a portion of a generic user device 300 with Bluetooth support is shown in FIG. 3. The user device 300 comprises an RF and BB receiver 302 for Bluetooth, an RF and BB transmitter 304 for Bluetooth. The RF and BB receiver 302 and RF and BB transmitter 304 for Bluetooth are together referred to herein as Bluetooth modem 306. The user device 300 also comprises a CPU 308 for overall control of the device. Bluetooth may be classified as Class-1, Class-2 or Class-3 with maximum RF transmitter power of 20 dBm, 4 dBm, and 0 dBm respectively.

The maximum RF transmit power of modems for some radio access technologies may not be high enough to require any RF power reduction to meet SAR requirements. For example, Class-2 and Class-3 Bluetooth devices have very low maximum RF transmit power and therefore SAR requirements can be met without any RF power reduction. In such cases, there may not be a need for user proximity detection. The maximum RF transmit power of modems for some radio access technologies may be high enough to require RF power reduction to meet SAR requirements. For example, the maximum RF transmit power for a user device in a 3GPP LTE WWAN system is 23 dBm and in a GSM system is 33 dBm.

When a user device is performing a particular activity it may be described as being in a particular state. For example, when a user device is actively performing data transfer with a network, it may be considered to be in Active state. For the purpose of proximity detection and SAR control, an Active state may also be defined as a state whenever RF Transmitter of a WWAN modem or a WLAN modem is on. Similarly, when a user device is not performing any data transfer with a network and not performing any other activity, it may be considered to be in Idle state. A user device may be in some other intermediate state depending on a particular scenario. Similarly, different subsystems of a user device may be in different states. For example, the WWAN modem may be in Active state or Idle state. Similarly, a WLAN modem, a Bluetooth modem, or a proximity sensor subsystem may be in Active or Idle state. The specific names used for the states for different subsystems may vary but the general idea remains the same. The power consumption of a subsystem may be different depending on the state it is in.

Different parts of a user device may be in different states depending on the prevailing scenario. For example, when a user device with WWAN modem in FIG. 2 is not performing any active data transfer over WWAN, the WWAN modem may be in Idle state. When a user device is performing active data transfer over WWAN, the WWAN modem may be in Active state. Similarly, when a proximity sensor is powered on and actively scanning for possible presence of a user nearby, it may be in Active state. Otherwise, it may be in Idle state. In Idle state of the proximity sensor, the power supply to it may be disabled.

In a conventional user device, the proximity sensor may be kept in Idle state when all the modems in a user device are in an Idle state, i.e., not in an active connection with the network. This is because when the user device does not have an active connection, the RF transmitters of none of the modems may be transmitting any RF power. In this scenario, even if a user is in the proximity of the device, the proximity sensor need not perform detection of user proximity.

In a conventional user device, the proximity sensor may be kept in an Active state when a modem in the user device is in an Active state, i.e., active data transfer ongoing with the network. This is because when the user device is in an Active state, the RF transmitter(s) in the user device may be transmitting RF power. In this case, regardless of the actual proximity of the user, the proximity sensor may be active to quickly detect the proximity of a user. These scenarios are illustrated in FIG. 4.

SUMMARY

Method and apparatus are disclosed that enable further reduced power consumption for a proximity sensor based on the use cases and internal states of a user device that include multiple modems such as WWAN for multiple RATs, WLAN, Bluetooth and other modems. The present disclosure may be applied to any user device that employs an RF transmitter and a proximity type of sensor.

In accordance with an aspect of the present disclosure, a method for proximity sensor control at a wireless communication device may include controlling, by a processing device at the wireless communication device, maintaining a proximity sensor of the wireless communication device in a Periodic Idle state, in which in the Periodic Idle state the proximity sensor is an Active state for a first duration less than a predetermined duration and autonomously returns to an Idle state having a second duration.

In one alternative, in the Period Idle state, the Idle state may have a second duration, in which the first duration and the second duration are set according to user input.

In one alternative, the method may include controlling, by the processing device, maintaining the wireless communication device in one state of the Idle state, the Periodic Idle state and the Active state, depending on a determined use case among a plurality of use cases for user proximity and a determined state of a Radio Frequency (RF) transmitter in at least one modem of the wireless communication device.

In one alternative, the at least one modem may include at least one of a Wireless Wide-Area Network (WWAN), Wireless Local Area Networks (WLAN) or Bluetooth modem.

In one alternative, the wireless communication device may be transitioned from a first state among the Idle State, the Periodic Idle state and the Active state to a second state among the Idle State, the Periodic Idle state and the Active state, in which first and second states are different, based on the determined use case and the determined state of the RF transmitter in the at least one modem.

In one alternative, the at least one modem may include a plurality of modems, wherein each modem of the plurality of modems which has a maximum RF transmit power satisfying a maximum RF transmit power reduction requirement may be a category A modem, and wherein each modem of the plurality of modems which has a maximum RF transmit power that does not satisfy the RF transmit power reduction requirement may be a category B modem, and the method may further include controlling, by the processing device, at least one of maintaining the proximity sensor in the Idle State when only a single first modem among the plurality of modems is in an Active modem state and the first modem is a Category A modem, maintaining the proximity sensor in the Active State when at least two second modems among the plurality of modems is in the Active modem state and each of the second modems is a Category A modem, maintaining the proximity sensor in the Active State when at least one third modem among the plurality of modems is in the Active state and each of the at least one third modem is a Category B modem, or maintaining the proximity sensor in the Active State when a fourth modem among the plurality of modems transitions to the Active state when at least one fifth modem among the plurality of modems is in the Active state, wherein the fourth modem is a Category A modem and the at least one fifth modem is a Category B modem.

In one alternative, the method may include controlling, by the processing device, transitioning to the Periodic Idle state by reducing a current rate of scanning by the proximity sensor from a first rate to a second rate.

In one alternative, the method may include controlling, by the processing device, when during the Periodic Idle state a user of the wireless communication device is determined to be proximate to the wireless communication device after a predetermined number of scans by the proximity sensor at the second rate, reducing the current rate of scanning by the proximity sensor from the second rate to a third rate.

In one alternative, the method may include controlling, by the processing device, during the Periodic Idle state, for a predetermined number times that the user of the wireless communication device is determined to be proximate to the wireless communication device after a predetermined number of scans by the proximity sensor at the current rate, reducing the current rate to another rate lower than the current rate.

In one alternative, the method may include controlling, by the processing device, when during the Periodic Idle state a user of the wireless communication device is determined not to be proximate to the wireless communication device, transitioning of the proximity sensor to the Active state, and starting periodic scanning at the proximity sensor at a first rate, wherein the first rate is greater than a second rate at which scanning is performed by the proximity sensor during the Periodic Idle state when the user of the wireless communication device is determined to be proximate to the wireless communication device.

In one alternative, the method may include controlling, by the processing device, maintaining the proximity sensor in the Idle state when the at least one modem is in the Active state and total RF transmitter power for all of the at least one modem is below a predetermined value.

In one alternative, the method may include controlling, by the processing device, transitioning the proximity sensor to the Active state or the Periodic Idle state when RF transmitter power to be used for RF transmission at the at least one modem is determined to be in a range where RF power reduction control is required.

In one alternative, the method may include controlling, by the processing device, updating a current state of the proximity sensor when a power control command is received from a network for any of the at least one modem.

In one alternative, the method may include controlling, by the processing device, when the power control command is to increase a current transmit power level to a new transmit power level, comparing the new transmit power level with a predetermined threshold for determining whether to change the current state of the proximity sensor.

In one alternative, the method may include controlling, by the processing device, evaluating a current state of the proximity sensor when a Timing Advance command indicating a change to transmit power level is received from a network for any of the at least one modem.

In one alternative, the method may include controlling, by the processing device, transitioning the proximity sensor to the Periodic Idle state for scanning at a lowest scanning rate among scanning rates of the Periodic Idle state, when a determination is a voice call over a Wireless Wide-Area Network (WWAN) is routed to the wireless communication device over a Bluetooth communication link.

In one alternative, the method may include controlling, by the processing device, when the wireless communication device is tethered by a cable to another device, determining whether to transition the proximity sensor from a current state based on a first predetermined RF maximum power threshold different from a second predetermined RF maximum power threshold corresponding to a first use case among the use cases associated with RF transmission by the RF transmitter in the at least one modem.

In one alternative, the another device may be a computer or headset.

In one alternative, the method may include controlling, by the processing device, when the wireless communication device is in a voice call and using a speakerphone mode, determining whether to transition the proximity sensor from a current state based on a first predetermined RF maximum power threshold different from a second predetermined RF maximum power threshold corresponding to a first use case among the use cases associated with RF transmission by the RF transmitter in the at least one modem.

In accordance with an aspect of the present disclosure, an apparatus for proximity sensor control at a wireless communication device may include circuitry configured to control, at the wireless communication device, maintaining a proximity sensor of the wireless communication device in a Periodic Idle state, in which in the Periodic Idle state the proximity sensor is an Active state for a first duration less than a predetermined duration and autonomously returns to an Idle state having a second duration.

In accordance with an aspect of the present disclosure, a wireless communication device may include a receiver to receive a wireless communication; and a processing device configured for proximity sensor control, wherein the processing device may be configured to control: maintaining a proximity sensor of the wireless communication device in a Periodic Idle state, in which in the Periodic Idle state the proximity sensor is an Active state for a first duration less than a predetermined duration and autonomously returns to an Idle state having a second duration.

BRIEF DESCRIPTION OF THE DRAWINGS

FIGS. 9A and 9B illustrate an example flow diagram for processing steps according to the aspects of the present disclosure.

DETAILED DESCRIPTION

Figure 1:
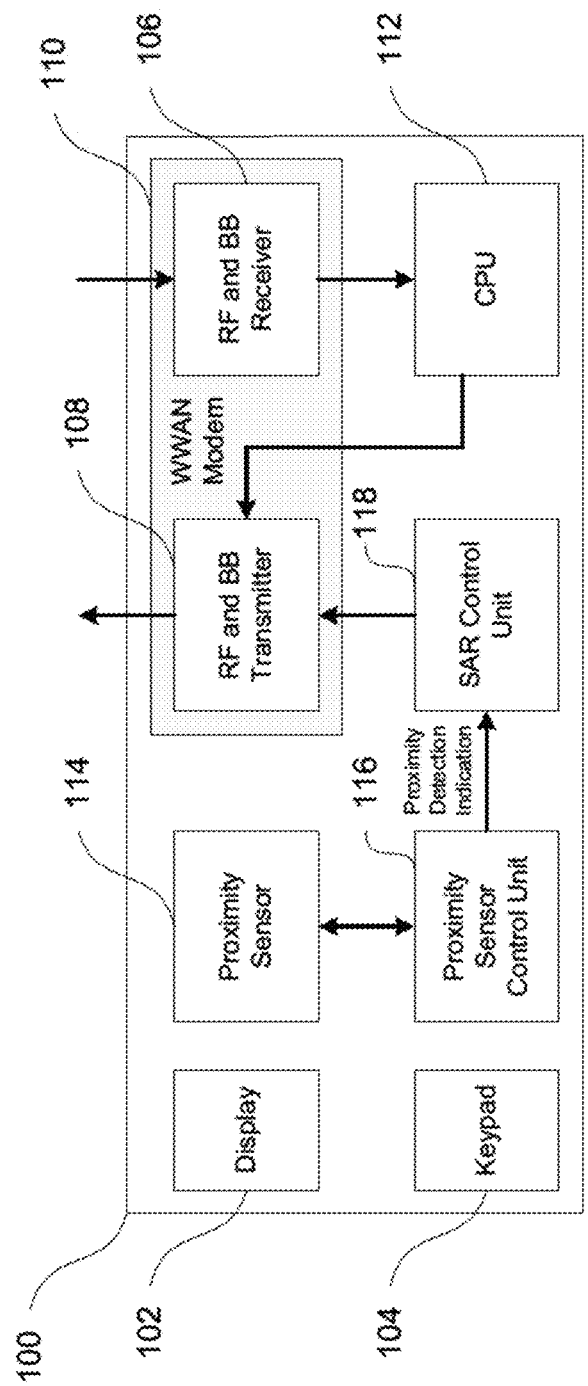
FIG. 1 illustrates a high level block diagram of a user device comprising a display, a keypad, a proximity sensor, and a Wireless Wide Area Network (WWAN) modem.
Figure 2:
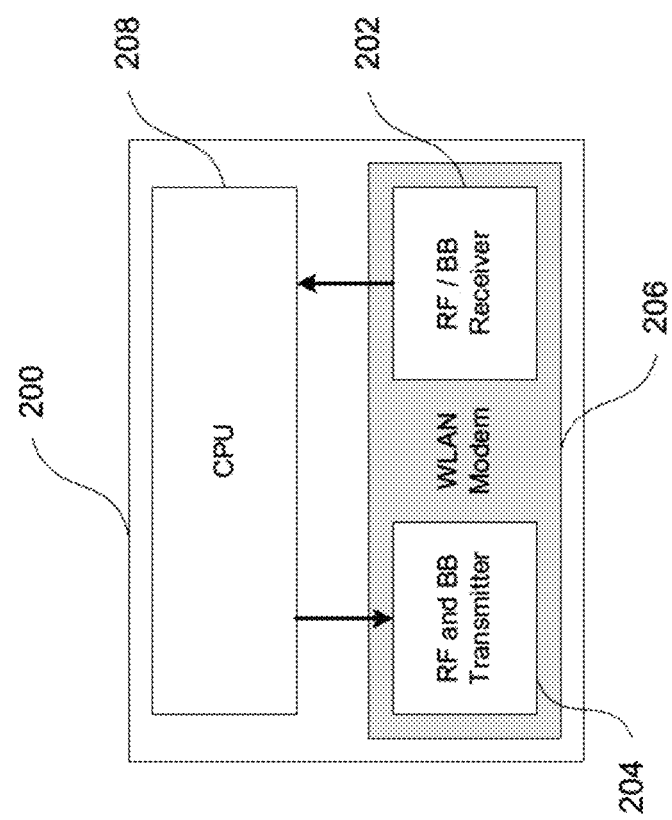
FIG. 2 illustrates a high level block diagram of a user device comprising a Wireless Local Area Network (WLAN) modem.
Figure 3:
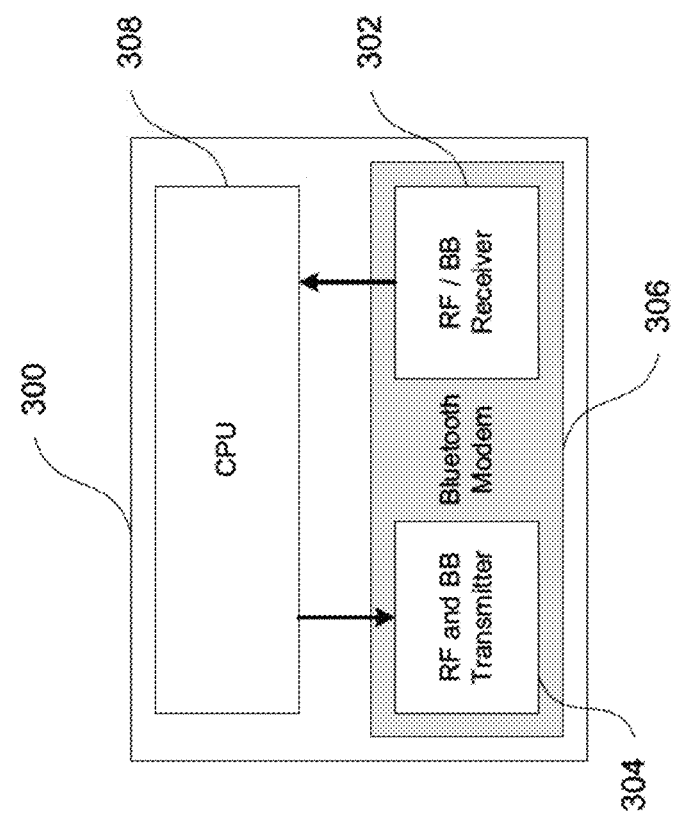
FIG. 3 illustrates a high level block diagram of a user device comprising a Bluetooth modem.
Figure 4:
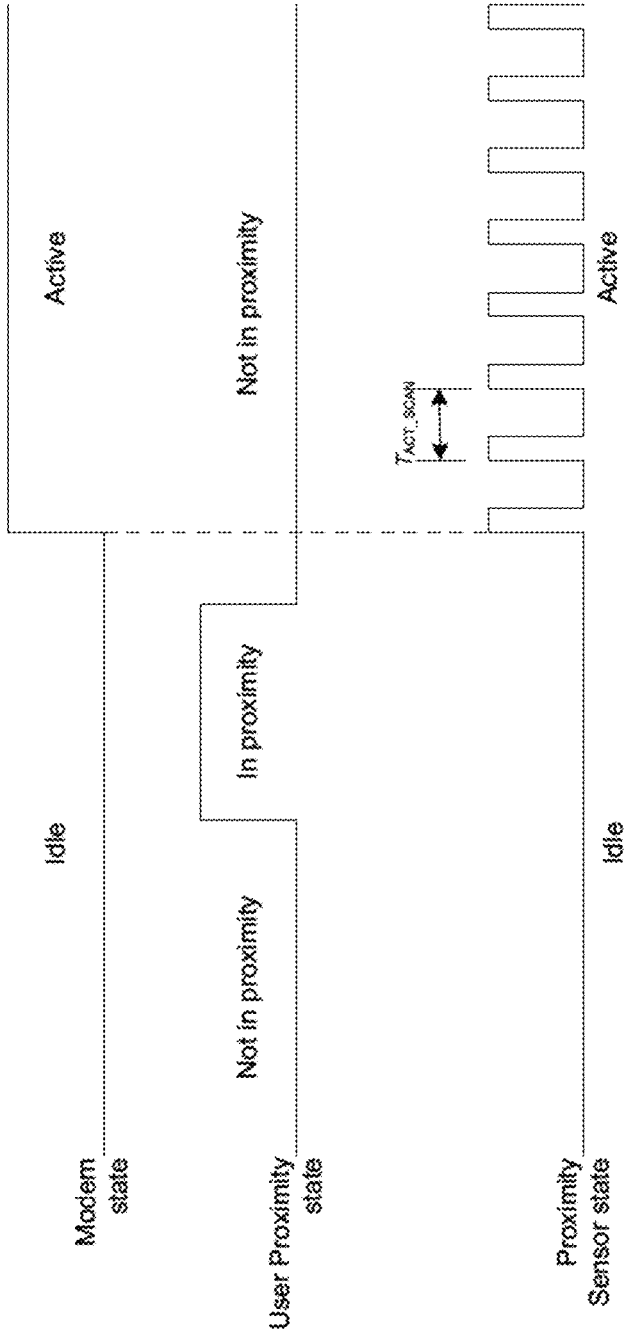
FIG. 4 illustrates the common use case of proximity detection for a device with WWAN modem.

The foregoing aspects, features and advantages of the present disclosure will be further appreciated when considered with reference to the following description of exemplary embodiments and accompanying drawings, wherein like reference numerals represent like elements. In describing the exemplary embodiments of the disclosure illustrated in the appended drawings, specific terminology will be used for the sake of clarity. However, the disclosure is not intended to be limited to the specific terms used.

Figure 5:
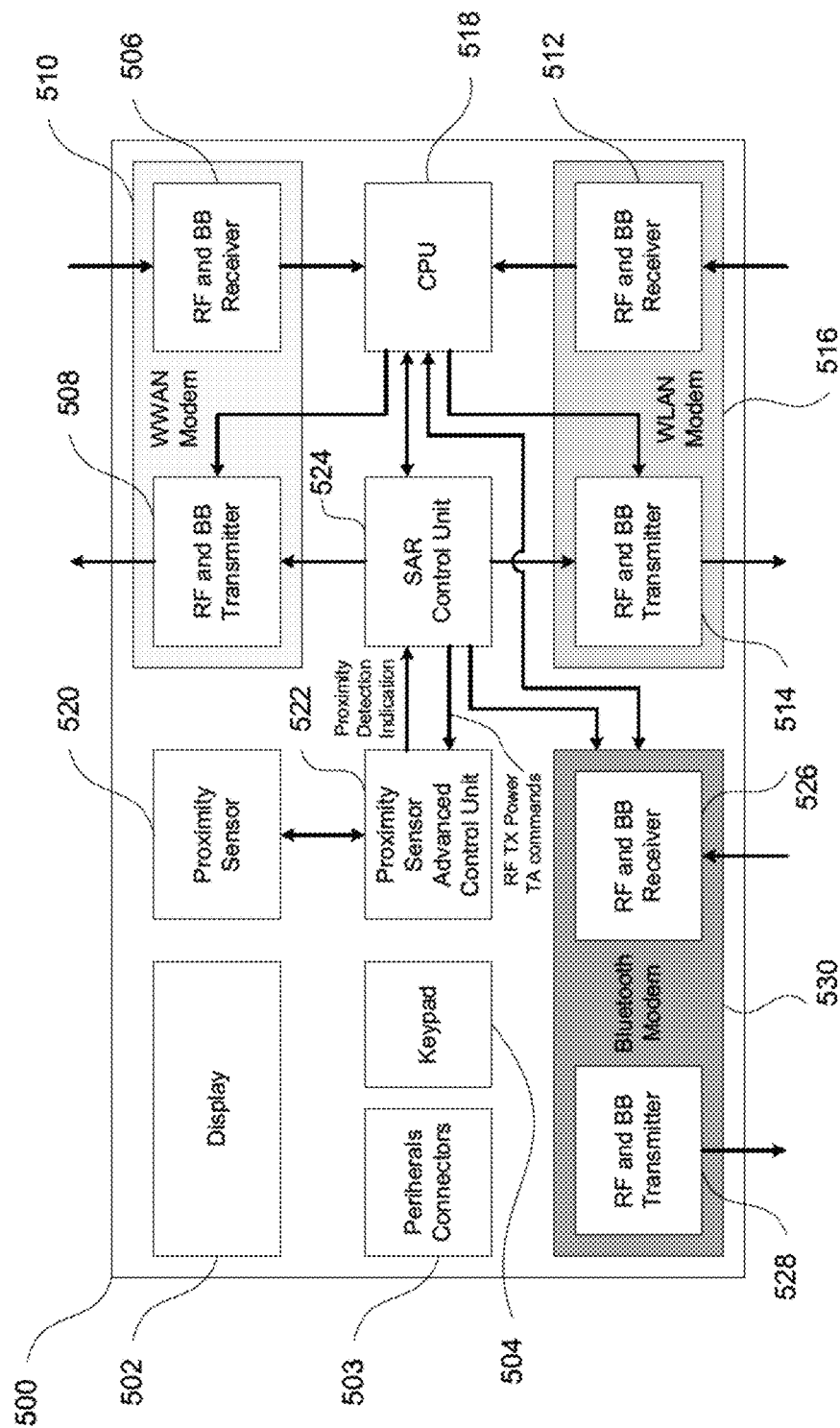
FIG. 5 illustrates a high level block diagram of a user device comprising a display, a keypad, a WWAN modem, a WLAN modem, a Bluetooth modem, a proximity sensor, a Proximity Sensor Advanced Control Unit, and a Specific Absorption Rate (SAR) Control Unit according to the aspects of the present disclosure.

A user device that employs proximity sensor control according to the aspects of the present disclosure is illustrated in FIG. 5. The user device 500 in FIG. 5 comprises a display 502, a set of peripherals and connectors 503, a keypad 504, a WWAN RF and BB receiver 506, and a WWAN RF and BB transmitter 508. The WWAN RF and BB receiver 506 and the WWAN RF and BB transmitter 508 together are referred to as WWAN modem 510. The user device 500 also comprises a WLAN RF and BB receiver 512 and a WLAN RF and BB transmitter 514. The WLAN RF and BB receiver 512 and the WLAN RF and BB transmitter 514 together are referred to as WLAN modem 516. The user device 500 also comprises a Bluetooth RF and BB receiver 526 and a Bluetooth RF and BB transmitter 528. The Bluetooth RF and BB receiver 526 and the Bluetooth RF and BB transmitter 528 together are referred to as Bluetooth modem 530. The user device 500 comprises one or more proximity sensor 520 for sensing proximity between the user and user device and a CPU 518 for overall control of the device. The user device 500 also comprises the SAR Control Unit 524 and the Proximity Sensor Advanced Control Unit 522 implemented according to the aspects of the present disclosure.

Different parts of a user device may be in different states depending on the prevailing scenario. For example, when the user device 500 in FIG. 5 with WWAN modem is not performing any active data transfer over WWAN, the WWAN modem may be in Idle state. When the user device 500 in FIG. 5 is performing active data transfer over WWAN, the WWAN modem may be in Active state. Similarly, when the user device 500 in FIG. 5 is not performing any active data transfer over WLAN, the WLAN modem may be in Idle state. When the user device 500 in FIG. 5 is performing active data transfer over WLAN, the WLAN modem may be in Active state. Similarly, when the user device 500 in FIG. 5 is not performing any active data transfer over Bluetooth with another device in a PAN, the Bluetooth modem may be in Idle state. When the user device 500 in FIG. 5 is performing active data transfer over Bluetooth with another device in a PAN, the Bluetooth modem may be in Active state.

Figure 6:
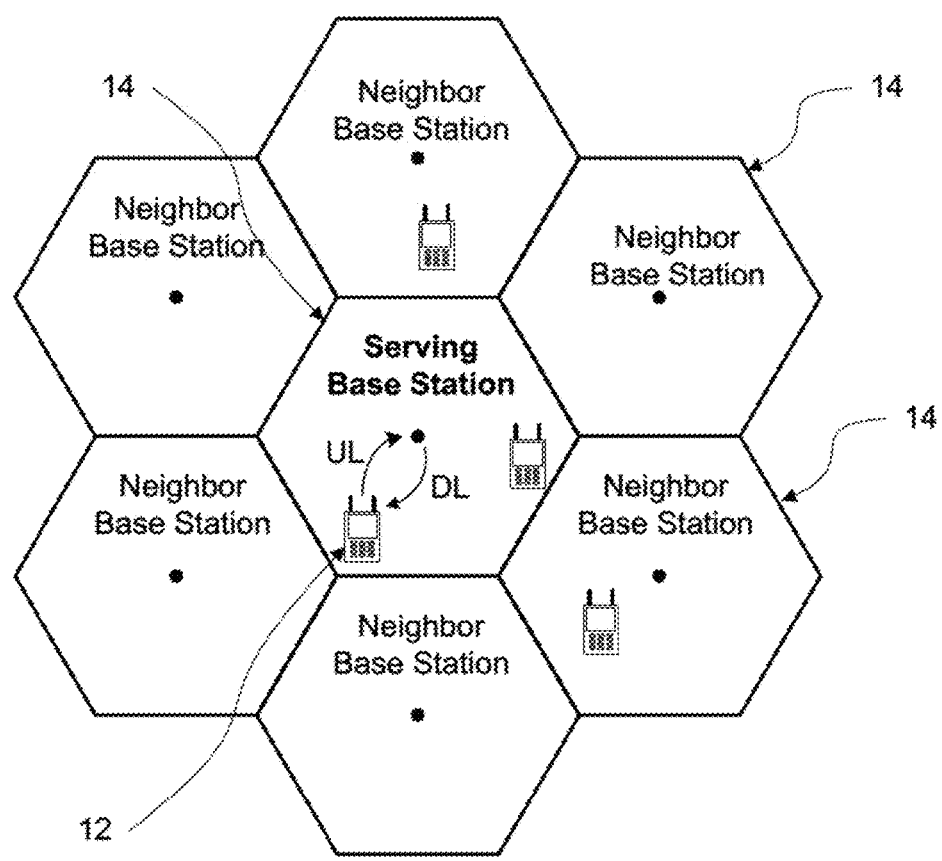
FIG. 6 illustrates a conventional mobile wireless communication system.

The user device 500 may be operating in a wireless communication system as illustrated in FIG. 6 where the user device is referred to as a mobile station (MS) 12.

In some scenarios, both the WWAN modem and WLAN modem may be in Active state. For example, in case a user device is capable of supporting a mobile Hotspot functionality, it may get internet service over WWAN modem and distribute it to other nearby devices over WLAN modem. In this case, the WLAN modem may serve as an Access Point. When the user device is distributing internet service to other nearby client devices, it may be considered to be operating in hotspot mode. The nearby client devices that are connected to the hotspot are considered to be tethered to the hotspot. In the hotspot mode with several client devices tethered to it, the average RF transmission power of a hotspot, and therefore the total RF transmit power $P_{TX\_TOTAL}$ of the user device, may be higher than a normal Wi-Fi client mode use case. In some scenarios, all three modems may be in Active state. For example, user may be listening to music over Bluetooth while accessing internet from WWAN through the WLAN which may be serving as a hotspot (Access Point).

According to another aspect of the present disclosure, power consumption of a proximity sensor may be reduced by maintaining an additional state called Periodic Idle state for the proximity sensor. In Periodic Idle state the sensor may be in Active state for a short duration and then may return to Idle state autonomously. According to another aspect of the present disclosure, during the Periodic Idle state the duration of Active and Idle states of the proximity sensor may be user configurable.

According to an aspect of the present disclosure, power consumption may be reduced by keeping the proximity sensor in Idle state, Periodic Idle state, or Active state depending on the various use cases for the user proximity and also based on the state of the RF transmitter in WWAN, WLAN, Bluetooth and other modems or transmitters in the user device. The state transition among the three states of the proximity sensor may be triggered by the user actions and state of the RF transmitter of the modems in the user device.

According to an aspect of the present disclosure, the modems in a user device may be grouped into two categories according to the maximum RF transmit power for the modem. A Category-A modem is defined as a modem whose maximum RF transmit power may be low enough that it does not need any reduction in RF transmit power to meet the SAR requirements. For example, Class-2 and Class-3 Bluetooth devices have maximum RF transmit power of 4 dBm and 0 dBm which are sufficiently low that SAR requirements can be met without any RF transmit power reduction. There may be other wireless technologies whose maximum RF power transmission may be low enough to not require RF power reduction for meeting SAR requirements. For example, a ZigBee modem based on the IEEE 802.15.4 specification may use low power RF transmitter. A Category-B modem is defined as a modem whose maximum RF transmit power may be high enough that it may need reduction in RF transmit power to meet the SAR requirements. For example, a 3GPP LTE WWAN modem has maximum RF transmit power of 23 dBm. In another example, an IEEE WLAN modem has maximum RF transmit power of up to 20 dBm. According to an aspect of the present disclosure, the categorization of the modems into different categories may be different depending on the actual SAR requirements. For example, the SAR requirements may be different in different countries and the categorization of the modems may be done accordingly. In another example, if the SAR requirements are updated by regulatory bodies within the same country, the categorization of modems may be different.

According to an aspect of the present disclosure, the proximity sensor may be maintained in Idle state if only a single Category-A modem is in Active state. For example, if only a Bluetooth modem is in Active state, the proximity sensor may be maintained in Idle state. According to an aspect of the present disclosure, the state of the proximity sensor may be maintained in Active state according to the aspects described herein when two or more Category-A modems are in Active state. For example, if both the Bluetooth modem and the ZigBee modem are in Active state, the state of the proximity sensor may be maintained in Active state according to the aspects described herein. According to an aspect of the present disclosure, the state of the proximity sensor may be maintained in Active state according to the aspects described herein when one or more Category-B modems are in Active state. According to an aspect of the present disclosure, when a Category-A modem transitions to Active state while one or more Category-B modems are already in Active state, the state of the proximity sensor may be maintained in Active state according to the aspects described herein.

Figure 7:
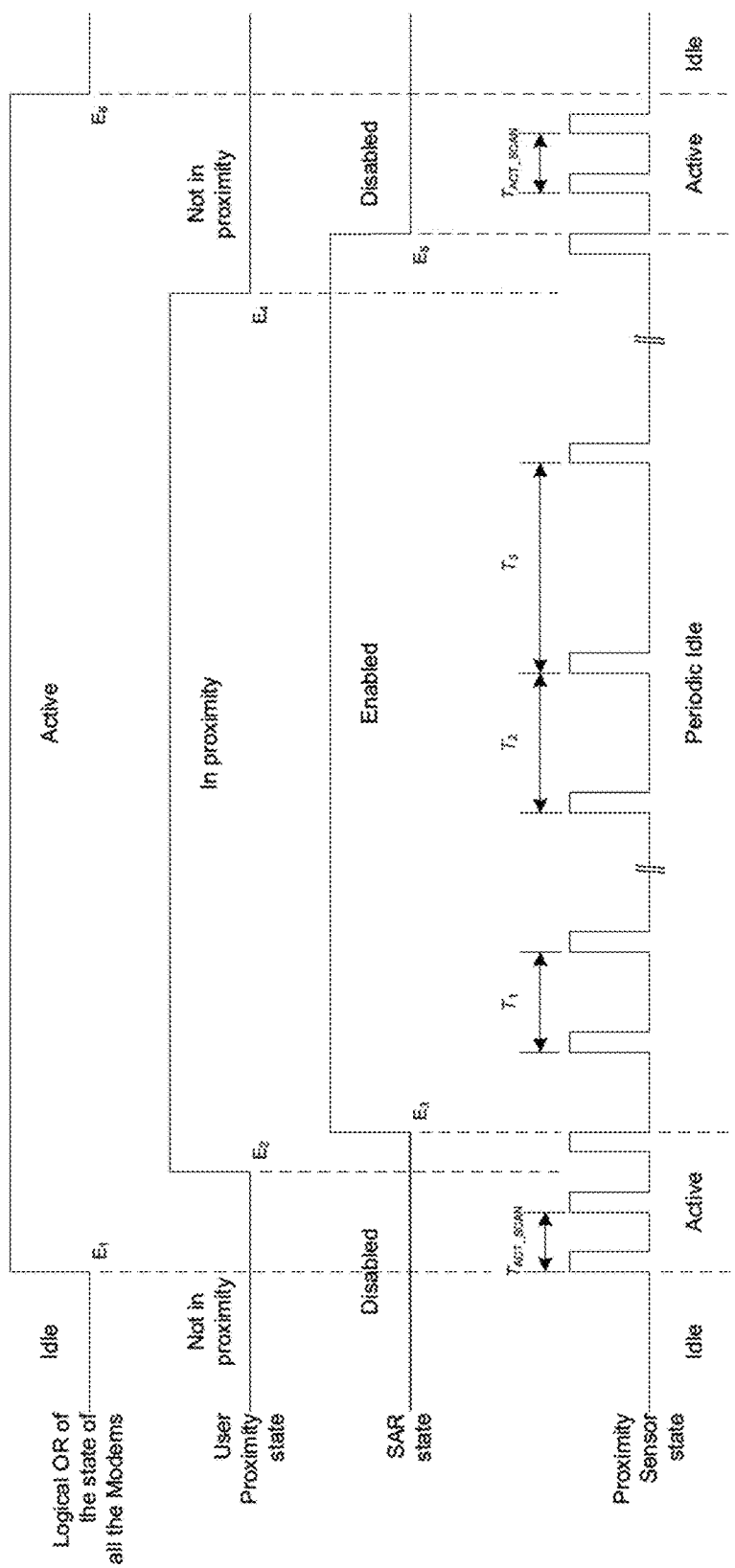
FIG. 7 illustrates the use cases of proximity detection and adaptive proximity sensor control when a single modem is in Active state according to aspects of the present disclosure.

Some aspects of the present disclosure for the proximity sensor state control are illustrated in FIG. 7 for the case when a single Category-B modem transitions from Idle state to Active state and back to Idle state. The line illustrating "Logical OR of the state of all the Modems" refers to the logical OR-ing of the state of all the modems in a user device. In the present case it corresponds to the state of a single WWAN modem. When the WWAN is in Active state, the line "Logical OR of the state of all the Modems" is shown to be in Active state. Prior to event $E_1$ in FIG. 7, all modems (WWAN, WLAN, Bluetooth, etc.) in the user device may be in Idle state and the user may not be in the proximity of the user device. Since all modems in the user device are in Idle state, the proximity sensor may be kept in Idle state. At event $E_1$, a WWAN modem in the user device enters Active state. This may trigger the proximity sensor to be in Active state. In Active state, scanning for the proximity of a user near the device may be performed at a high periodicity of $T_{ACT\_SCAN}$. The duration of $T_{ACT\_SCAN}$, for example, may be 30 ms. The high periodicity of scanning may be used to ensure that when a user does get proximate to the user device, it can be detected with less delay. At event $E_2$, the user does become proximate to the user device. During the next scan in the Active state of the proximity sensor, the presence of the user near the user device may be detected by the Proximity Sensor Advanced Control Unit 522 in FIG. 5 at event $E_3$. As a result of this detection, two actions may be taken. First, an indication is provided by the Proximity Sensor Advanced Control Unit 522 to the SAR Control Unit 524 that the user proximity is detected. The SAR Control Unit 524 may determine whether to reduce the RF transmitter power to meet the regulatory requirements as described earlier. This may transition the SAR state from "SAR Disabled" to "SAR Enabled." Second, according to an aspect of the present disclosure, the proximity sensor may enter into the Periodic Idle state where the periodicity of the scanning is reduced from $T_{ACT\_SCAN}$ to $T_1$. The duration of $T_1$, for example, may be 100 ms. According to an aspect of the present disclosure, after a configurable number of scans at the periodicity of $T_1$, if the user is still found to be proximate to the user device, the scan periodicity may be further reduced to $T_2$. The duration of $T_2$, for example, may be 500 ms. According to an aspect of the present disclosure, after a configurable number of scans at the periodicity of $T_2$, if the user is still found to be proximate to the user device, the scan periodicity may be further reduced to $T_3$. The duration of $T_3$, for example, may be 2 seconds. According to an aspect of the present disclosure, the number of adaptively increasing values for the scan periodicity may be an implementation choice. For example, the number of different scan periodicities used in a Periodic Idle state may be 2, 3, 4, etc. At event $E_4$, the user may move away from the user device. This event may be detected by the Proximity Sensor Advanced Control Unit 522 during the next scan at event $E_5$. As a result of this detection, two actions may be taken. First, the Proximity Sensor Advanced Control Unit 522 sends an indication to the SAR Advanced Control Unit 524 that the user is not proximate to the user device. The SAR Advanced Control Unit may determine whether to increase the RF transmitter power as per the normal power control commands from the network. Second, according to an aspect of the present disclosure, the proximity sensor transitions to Active state and starts the periodic scanning at a faster rate of $T_{ACT\_SCAN}$ as before to ensure that when a user again becomes proximate to the user device, it may be detected with less delay. Eventually, at event $E_6$ a WWAN modem in the user device may exit the Active state and enter the Idle state. At this event, the proximity sensor may be transitioned to the Idle state. The Idle state of a proximity sensor may include completely powering it off.

The proximity sensor state transition control aspects described above are applicable to the case of any single Category-B modem transitioning from Idle state to Active state and back to Idle state.

Figure 8:
FIG. 8 illustrates the use cases of proximity detection and adaptive proximity sensor control when multiple modems are in Active state according to aspects of the present disclosure.

Some aspects of the present disclosure for the proximity sensor state control are illustrated in FIG. 8 for the case when two Category-B modems transition from Idle state to Active state and back to Idle state. The line illustrating "Logical OR of the state of all the Modems" refers to the logical OR-ing of the state of all the modems in a user device. In the present case it corresponds to the logical OR of the state of WWAN and WLAN modems. When either the WWAN modem or WLAN modem is in active state, the line "Logical OR of the state of all the Modems" is shown to be in Active state. Prior to event $E_1$ in FIG. 8, all modems (WWAN, WLAN, Bluetooth, etc.) in the user device may be in Idle state and the user may not be in the proximity of the user device. Since all modems in the user device are in Idle state, the proximity sensor may be kept in Idle state. At event $E_1$, a WWAN modem in the user device may enter into Active state. This may trigger the proximity sensor to be in Active state. In Active state, scanning for the proximity of a user near the user device may be performed at a high periodicity of $T_{ACT\_SCAN}$. The duration of $T_{ACT\_SCAN}$, for example, may be 30 ms. The high periodicity of scanning may be used to ensure that when a user does get proximate to the user device, it can be detected with less delay. At event $E_2$, the user does become proximate to the user device. During the next scan in the Active state of the proximity sensor, the presence of the user near the user device may be detected by the Proximity Sensor Advanced Control Unit 522 in FIG. 5 at event $E_3$. As a result of this detection, two actions may be taken. First, an indication is provided by the Proximity Sensor Advanced Control Unit 522 to the SAR Advanced Control Unit 524 in FIG. 5 that the user proximity is detected. The SAR Advanced Control Unit may determine whether to reduce the RF transmitter power to meet the regulatory requirements as described earlier. This may transition the SAR state from "SAR Disabled" to "SAR Enabled." Second, according to an aspect of the present disclosure, the proximity sensor may enter into the Periodic Idle state where the periodicity of the scanning is reduced from $T_{ACT\_SCAN}$ to $T_1$ and may transition to longer duration periodicity as described earlier.

At event $E_4$, the WLAN modem becomes Active state. At this point the proximity sensor may be in Periodic Idle state and the periodicity may be reevaluated based on the total power of the WWAN modem and the WLAN modem RF transmitters. Since the user is detected to be already proximate to the user device in the present example, the periodicity may be retained the same. However, the SAR Advanced Control Unit 524 may reevaluate the required RF transmitter power reduction as per the aspects described earlier.

At event $E_5$, the WWAN modem transitions to Idle state. At this point the proximity sensor may be in Periodic Idle state and the periodicity may be reevaluated based on the RF transmit power of the WLAN modem. Since the user is detected to be already proximate in the present example, the periodicity may be retained the same. However, the SAR Advanced Control Unit 524 may reevaluate the required RF transmitter power reduction as per the aspects described earlier. For example, the SAR Advanced Control Unit 524 may increase the power according to the power control commands received from the WLAN network. Note that the "Logical OR of the state of all the Modems" still remains in Active state as illustrated.

At event $E_6$, the user may move away from the user device. This event may be detected by the Proximity Sensor Advanced Control Unit 522 during the next scan at event $E_7$. As a result of this detection, two actions may be taken. First, the Proximity Sensor Advanced Control Unit 522 sends an indication to the SAR Control Unit 524 that the user is not proximate to the user device. The SAR Advanced Control Unit may determine whether to increase the RF transmitter power as per the normal power control commands from the network. Second, according to an aspect of the present disclosure, the proximity sensor transitions to Active state and starts the periodic scanning at a faster rate of $T_{ACT\_SCAN}$ as before to ensure that when a user again becomes proximate to the user device, it may be detected with less delay. Eventually, at event $E_8$ a WLAN modem in the user device may exit the Active state and enter the Idle state. The "Logical OR of the state of all the Modems" may be in Idle state as illustrated. At this event, the proximity sensor may go into the Idle state.

According to another aspect of the present disclosure, the proximity sensor may be kept in Idle state if the user device is in Active state but its total RF transmitter power from all modem subsystems is such that the SAR is below the regulatory requirements. According to another aspect of the present disclosure, if the RF transmitter power to be used for transmission is in the range where RF power reduction for SAR control may be required, the proximity sensor may be put in Active state or Periodic Idle state. For example, in the 3GPP LTE wireless communication system, the RF transmitter may transmit RF power in the range −40 dBm to +23 dBm. The RF transmitter power reduction may be required for SAR control only when, for example, the RF transmit power is in the range +16 dBm to +23 dBm. The proximity sensor may be activated only when the RF transmit power is in that range in case the WWAN modem for 3GPP LTE wireless communication system is the only active modem. If WLAN and Bluetooth PAN modems are also active, the total RF transmitter power from all modem subsystems may be checked to evaluate whether it is in the range where RF transmit power reduction for SAR may be required.

According to another aspect of the present disclosure, the state of the proximity sensor may be updated whenever a power control command is received from the network for any of the WWAN, WLAN, or Bluetooth modems. When a command to increase the transmit power level is received, the new transmit power level may be compared against the configurable thresholds for changing the state of the proximity sensor. For a certain range of total RF transmit power level, for example below 10 dBm, the proximity sensor may be in Idle state. For another RF transmit power range, for example, 10 dBm to 16 dBm range, it may be in Periodic Idle state. In Periodic Idle state, the periodicity of scanning the sensor may be further controlled based on the exact RF transmit power level. For example, with transmit power level of 12 dBm or lower the periodicity may be $T_3$, with transmit power level of 14 dBm or lower the periodicity may be $T_2$, and with transmit power level of 16 dBm or lower the periodicity may be $T_1$. For transmit power above 16 dBm, the proximity sensor may be in Active state. The proximity sensor may transition back and forth depending on the received transmit power level commands. The thresholds for changing the state of the proximity sensor may be configurable.

According to another aspect of the present disclosure, a Timing Advance (TA) command received from the network may be used as a trigger to reevaluate the current state of the proximity sensor. An increase in timing advance may be a precursor to increase in transmit power level. A decrease in timing advance may be a precursor to decrease in transmit power level. For example, if the proximity sensor is in the Periodic Idle state, the periodicity may be increased in case of increased TA to quickly detect possible user proximity and periodicity may be decreased in case of decreased TA.

According to another aspect of the present disclosure, if a voice call over a WWAN is routed to the user over the Bluetooth link, the proximity sensor may be put into Periodic Idle state with the lowest periodicity, i.e., proximity sensor is scanned least frequently. This is because a user device proximity condition may not change rapidly when a Bluetooth link is used. If the user disconnects Bluetooth link and uses the normal user device for the voice call, the proximity sensor may be put into Active state and it may subsequently adapt to a different state according to the aspects of the present disclosure.

According to another aspect of the present disclosure, when a user device is tethered to another device, for example using a USB cable to connect to a Host computer, the Proximity Sensor Advanced Control Unit 522 in FIG. 5 may use different configurable thresholds for state transitions of the proximity sensor. Similarly, when an accessory device, such as a headset, is attached to a user device the Proximity Sensor Advanced Control Unit may use different configurable thresholds for state transitions of the proximity sensor and SAR control. For example, the duration $T_1$, $T_2$, $T_3$, etc. of different Periodic Idle states may be different than the case where the user device is not tethered to another device using a USB cable or an accessory.

According to another aspect of the present disclosure, when a user device is in a voice call and using speakerphone mode, the Proximity Sensor Advanced Control Unit 522 in FIG. 5 may use different configurable parameters for state transitions of the proximity sensor.

Some of the processing aspects of the present disclosure are illustrated in the flow diagram 900 contained in FIG. 9A. At processing stage 902, the various parameters for the aspects of the present disclosure are initialized. The parameters management and its initialization may be handled by the SAR Control Unit 524 and Proximity Sensor Advanced Control Unit 522 in FIG. 5. Specifically, the proximity sensor state is initialized to Idle. Similarly, the state variables for all the modems are initialized to Idle in the Proximity Sensor Advanced Control Unit 522 in FIG. 5. The present description is for the purpose of controlling the proximity sensor state as a function of state of other subsystems in the user device. The state of other subsystems of the user device may change depending on the various scenarios of the respective subsystems. The periodicity timers $T_{ACT\_SCAN}$, $T_1$, $T_2$, and $T_3$ are initialized to the user configured values or default values of, for example, 30 ms, 100 ms, 500 ms and 2 seconds respectively. Similarly, the thresholds THR1, THR2, THR3, and THR4 for detecting different states of the proximity sensor are initialized to user configured values or default values of, for example, 10 dBm, 12 dBm, 14 dBm, and 16 dBm respectively. As per the aspects of the present disclosure, $T_{ACT\_SCAN} < T_1 < T_2 < T_3$ and THR1<THR2<THR3<THR4. Finally the counters $N_1$, $N_2$, and $N_3$, which are used for controlling the transition from one periodicity to another, are initialized to zeros. The maximum values for these counters $N_{1max}$, $N_{2max}$, and $N_{3max}$, are initialized according to user configured values or default value of, for example, three for each counter.

At processing stage 904, the state of each of the modems is determined. If none of the modems is in Active state, the processing returns to the same stage 904. If one or more of the Category-B modems such as WWAN or WLAN modems or two or more Category-A modems such as Bluetooth and ZigBee are in Active state, the processing continues to processing stage 906 where the total transmit power $P_{TX\_TOTAL}$ of all the active modems is computed. At processing stage 908, the total transmit power $P_{TX\_TOTAL}$ is compared against the threshold THR1. If the power $P_{TX\_TOTAL}$ is less than the threshold THR1, the processing continues to stage 916 where the proximity sensor is placed into Idle state. The processing then returns to the stage 906. If the transmit power $P_{TX\_TOTAL}$ is not less than the threshold THR1, the processing continues to stage 910. At processing stage 910, the total transmit power $P_{TX\_TOTAL}$ is compared against the threshold THR2. If the transmit power $P_{TX\_TOTAL}$ is less than the threshold THR2, the processing continues to stage 918 where the proximity sensor is placed into Periodic Idle state with periodicity of $T_3$. The processing then continues to stage 922. If the power $P_{TX\_TOTAL}$ is not less than the threshold THR2, the processing continues to stage 912. At processing stage 912, the total transmit power $P_{TX\_TOTAL}$ is compared against the threshold THR3. If the transmit power $P_{TX\_TOTAL}$ is less than the threshold THR3, the processing continues to stage 920 where the proximity sensor is placed into Periodic Idle state with periodicity of $T_2$. The processing then continues to stage 922. If the total transmit power $P_{TX\_TOTAL}$ is not less than the threshold THR3, the processing continues to stage 913. At processing stage 913, the total transmit power $P_{TX\_TOTAL}$ is compared against the threshold THR4. If the transmit power $P_{TX\_TOTAL}$ is less than the threshold THR4, the processing continues to stage 921 where the proximity sensor is placed into Periodic Idle state with periodicity of $T_1$. The processing then continues to stage 922. If the total transmit power $P_{TX\_TOTAL}$ is not less than the threshold THR4, the processing continues to stage 914 where the proximity sensor is placed in Active state. The processing then continues to stage 922.

At processing stage 922, the proximity sensor is enabled based on its currently configured periodicity value, i.e., $T_{ACT\_SCAN}$, $T_1$, $T_2$, or $T_3$ and the proximity of a user is checked. The processing then continues to stage 924 where the counter $N_1$, $N_2$, or $N_3$ is incremented depending on whether the proximity sensor is in Periodic Idle state and if so its periodicity. Next at processing stage 926, the current value of the counter is checked against the maximum value configured for that particular Periodic Idle state. If the counter value exceeds the configured maximum value, the processing continues to stage 928. The longer the periodicity for the proximity sensor, the lower the power consumption. The longest periodicity corresponds to lower power consumption state while still scanning the proximity sensor. In processing stage 928, the state of the proximity sensor transitions from Periodic Idle state with one periodicity to the next periodicity with lower power consumption, i.e., with longer periodicity. If the lowest power state is reached, i.e., the longest periodicity (in the present example, the longest periodicity corresponds to the periodicity timer $T_3$), then it remains in that state until other events cause further Proximity Sensor state transitions. The processing then continues to processing stage 930. Processing stage 930 is an off-page reference to the continuation of present flow diagram in FIG. 9B.

Figure 9B:
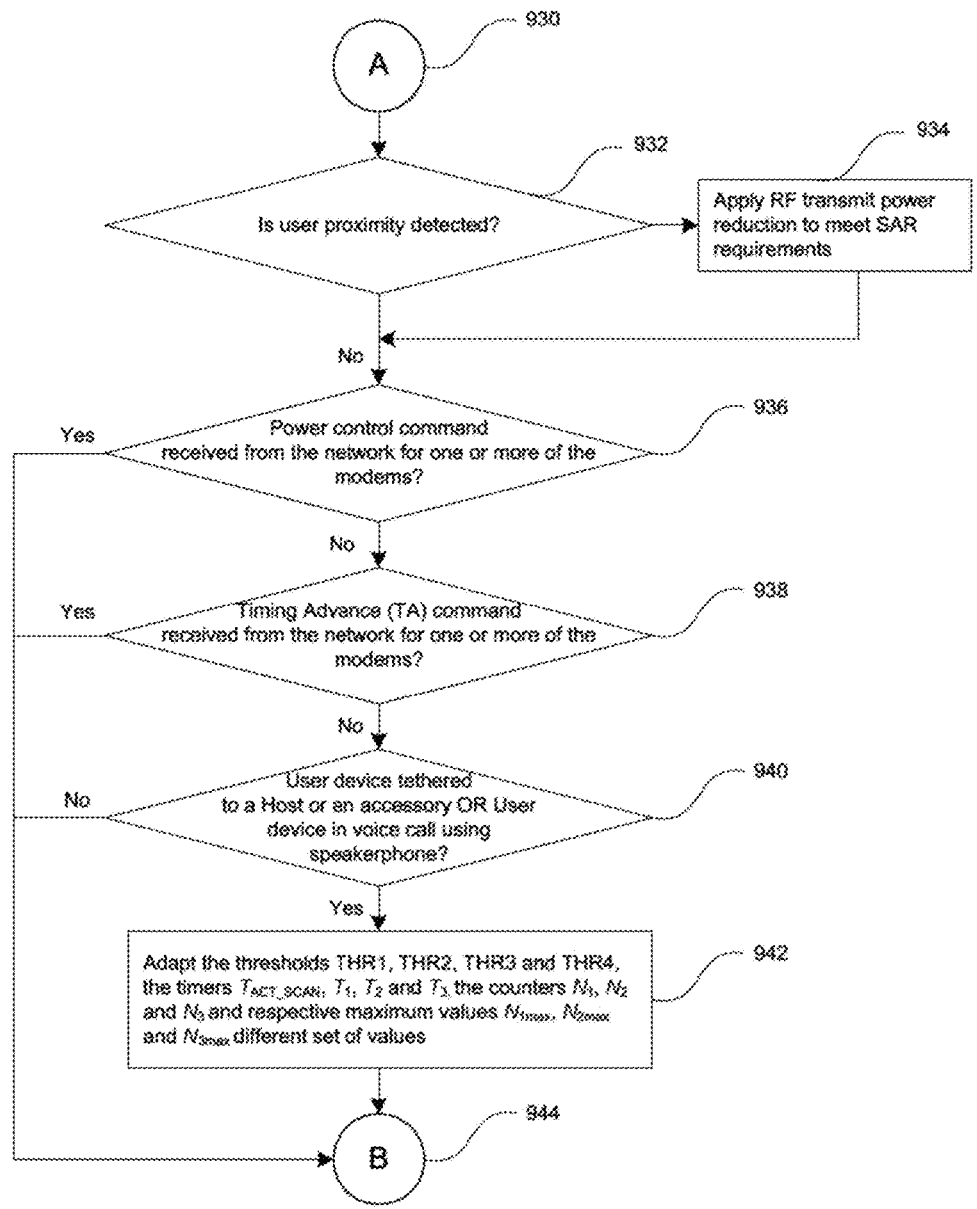

In FIG. 9B, at processing stage 932, a determination is made whether user proximity is detected or not based on the measurements made using the proximity sensor. If user proximity is detected, the processing continues to processing stage 934. At processing stage 934, the RF transmit power of one or more of the modems in the user device may be controlled as per the aspects of the present disclosure described earlier. Next the processing continues to processing stage 936. Returning to processing stage 932, if the user proximity is not detected, the processing continues to processing stage 936. At processing stage 936, a determination is made whether any power control commands are received from network in one or more of the modems. If a power control command is received, the processing continues to the processing stage 944 which is an off-page reference to the continuation of the present flow diagram in FIG. 9A. If a power control command is not received, the processing continues to the processing stage 938. At processing stage 938, a determination is made whether any Timing Advance commands are received from network in one or more of the modems. If a timing advance command is received, the processing continues to the processing stage 944. If a timing advance command is not received, the processing continues to the processing stage 940. At processing stage 940, two determinations may be made: (1) whether the user device is tethered to any host device or whether an accessory device is connected to it and (2) whether the user device is in a voice call using speakerphone. For example, the first determination can be made when an accessory device is connected to the peripheral 503 or a Bluetooth device is connected over Bluetooth modem 530 in the user device 500 illustrated in FIG. 5. The second determination can be made based on the state of the user device. If both the determinations are false, the processing continues to processing stage 944. If either one of the determinations are true, the processing continues at processing stage 942 where the various parameters of the present disclosure, i.e., THR1, THR2, THR3, THR4, $T_{ACT\_SCAN}$, $T_1$, $T_2$, $T_3$, $N_1$, $N_2$, $N_3$, $N_{1max}$, $N_{2max}$, and $N_{3max}$ are adapted according to the two determinations made in processing stage 940. If a user device was previously tethered to any host device or connected to an accessory device and then becomes un-tethered or disconnected, the various parameters described above may be adapted for that state. If a user device was previously in a voice call using speakerphone and the call is ended or the speakerphone is no longer used, the various parameters described above may be adapted for that state. The processing then continues to processing stage 944. The processing continues in this manner until a user device is turned off. As such there is no state at which the processing of proximity detection terminates.

Aspects of the processing flow in FIG. 9A and FIG. 9B may be implemented in Proximity Sensor Advanced Control Unit 522 in FIG. 5.

Aspects of the present disclosure may be applied to all types of user devices for mobile communications systems such as systems based on 3GPP LTE wireless communication standard, systems based on 3GPP Wideband Code Division Multiple Access (WCDMA) standard, systems based on 3GPP2 Code Division Multiple Access (CDMA) standard, WLAN systems based on an IEEE 802.16 wireless communication standard, etc.

Aspects of the present disclosure may be applicable to any type of proximity sensors including Infra-Red (IR) or capacitive type sensors.

Although the aspects of the disclosure are described with SAR control as one intended application, it may be applicable to other uses such as controlling the display, touch screen, loudspeaker, etc. in a user device.

By way of example only, the above-described method may be implemented in a user device such as a wireless mobile station (MS) 12 as shown in FIG. 6.

Figure 10:
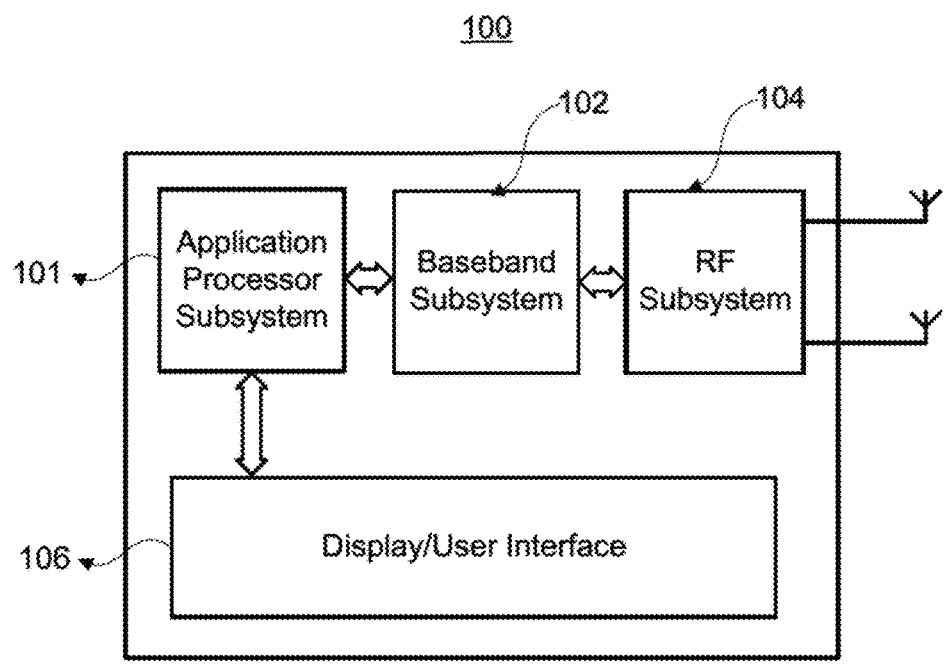
FIG. 10 illustrates a wireless mobile station diagram, which may be employed with aspects of the disclosure described herein.

As shown in FIG. 10, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 11:
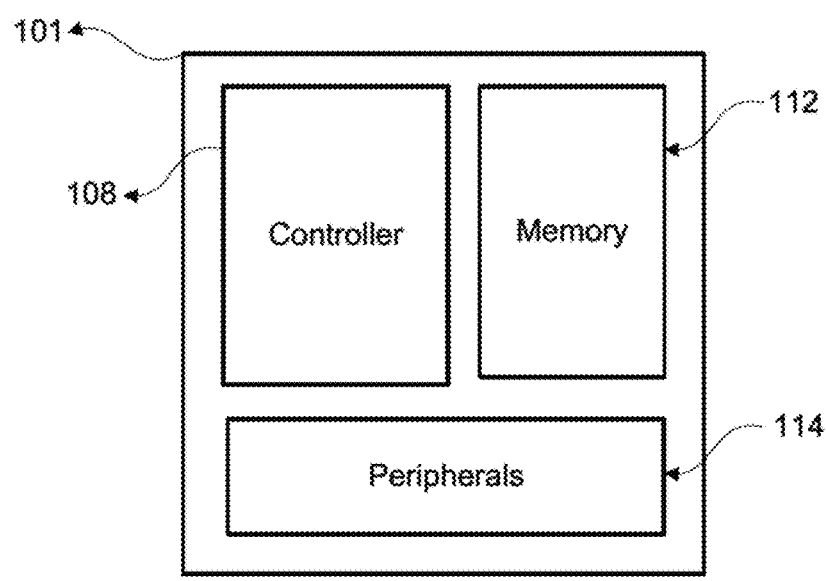
FIG. 11 illustrates an application processor subsystem for a wireless mobile station, which may be employed with aspects of the disclosure described herein.
Figure 12:
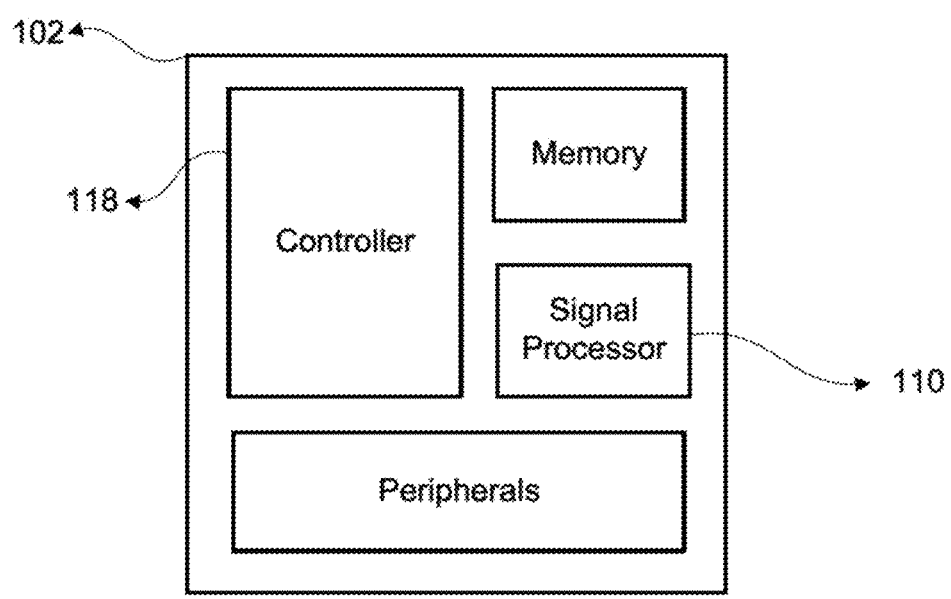
FIG. 12 illustrates a baseband subsystem for a wireless mobile station, which may be employed with aspects of the disclosure described herein.
Figure 13:
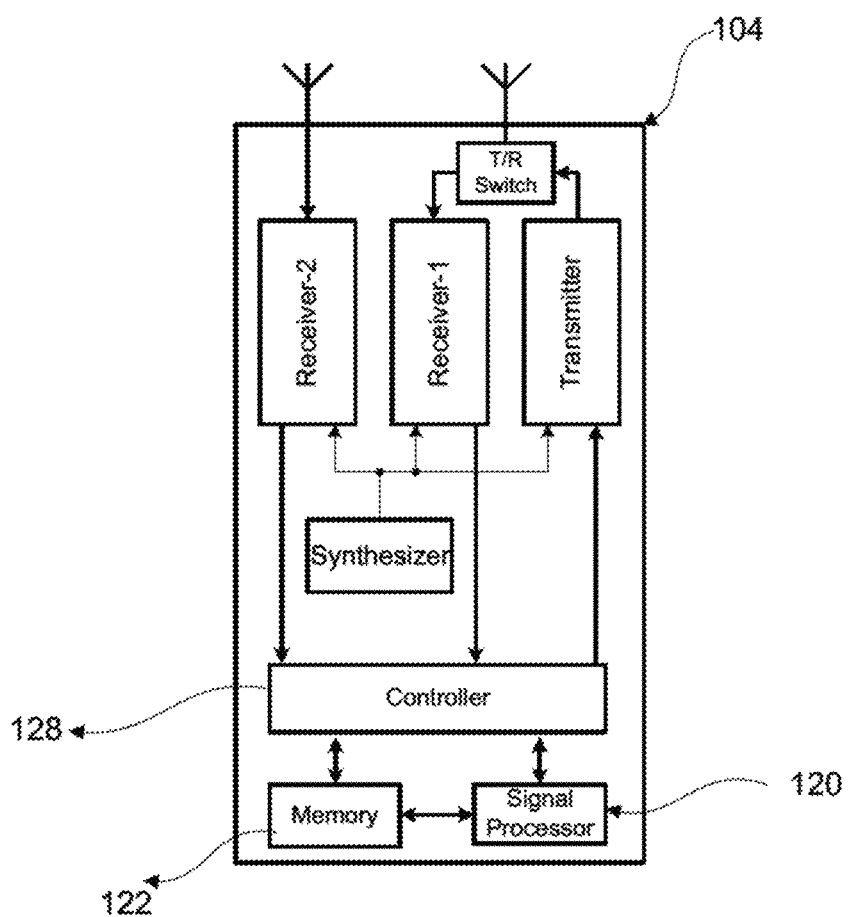
FIG. 13 illustrates an RF subsystem for a wireless mobile station, which may be employed with aspects of the disclosure described herein.

The application processor subsystem 101 as shown in FIG. 11 may include a controller 108 such as a microcontroller, another processor or other circuitry. The baseband subsystem 102 as shown in FIG. 12 may include a controller 118 such as a microcontroller or other processor. The RF subsystem 104 as shown in FIG. 13 may include a controller 128 such as a microcontroller, another processor or other circuitry. The controller 108 in FIG. 11 desirably handles overall operation of the MS 100. This may be done by any combination of hardware, software and firmware running on the controller 108. Such a combination of hardware, software and firmware may embody any methods in accordance with aspects of the present disclosure.

In FIG. 11 the peripherals 114 such as a full or partial keyboard, video or still image display, audio interface, etc may be employed and managed through the controller 108.

Aspects of the present disclosure may be implemented in firmware of the controller 108 of the application processor in FIG. 11 and/or the controller 118 of the baseband subsystem in FIG. 12. In another alternative, aspects of the present disclosure may also be implemented as a combination of firmware and hardware of the application processor subsystem 101 and/or the baseband subsystem 102. For instance, a signal processing entity of any or all of the FIG. 12 may be implemented in firmware, hardware and/or software. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use the aspects of the disclosure may include smartphones, tablets, laptops, gaming consoles, cameras, video camcorders, TV, car entertainment systems, etc.

Although aspects of the disclosure herein have been described with reference to particular embodiments, it is to be understood that these embodiments are merely illustrative of the principles and applications of the aspects of the present disclosure. It is therefore to be understood that numerous modifications may be made to the illustrative embodiments and that other arrangements may be devised without departing from the spirit and scope of the aspects of the present disclosure as defined by the appended claims. Aspects of each embodiment may be employed in the other embodiments described herein.

The invention claimed is:

1. A method for proximity sensor control at a wireless communication device, the method comprising:
   controlling, by a processing device at the wireless communication device,
      maintaining a proximity sensor of the wireless communication device in a Periodic Idle state, in which for each given rate of scanning by the proximity sensor in the Periodic Idle state, the proximity sensor is in an Active scan state for a first given duration less than a predetermined duration and autonomously returns to an Idle non-scan state having a second given duration; and
      transitioning, within the Periodic Idle state, from a first rate of scanning by the proximity sensor to a second rate of scanning by the proximity sensor, based on a determination that a user continues to be proximate the wireless communication device,
   in which the first rate of scanning has an Active scan state periodicity of a first time length, the second rate of scanning has an Active scan state periodicity of a second time length and the second time length is greater than the first time length,
   controlling, by the processing device, when during the Periodic Idle state the user of the wireless communication device is determined to be proximate to the wireless communication device after a predetermined number of scans by the proximity sensor at the second rate, reducing a current rate of scanning by the proximity sensor from the second rate to a third rate, and
   controlling, by the processing device, during the Periodic Idle state, for a predetermined number times that the user of the wireless communication device is determined to be proximate to the wireless communication device after a predetermined number of scans by the proximity sensor at the current rate, reducing the current rate to another rate lower than the current rate.

2. The method of claim 1, wherein, in the Periodic Idle state, the first given duration and the second given duration are set according to user input.

3. The method of claim 1, further comprising:
   controlling, by the processing device,
      maintaining the wireless communication device in one state of an Idle state, the Periodic Idle state and an Active state, depending on a determined use case among a plurality of use cases for user proximity and a determined state of a Radio Frequency (RF) transmitter in at least one modem of the wireless communication device.

4. The method of claim 3, wherein the at least one modem includes at least one of a Wireless Wide-Area Network (WWAN), Wireless Local Area Networks (WLAN) or Bluetooth modem.

5. The method of claim 3, wherein the wireless communication device is transitioned from a first state among the Idle State, the Periodic Idle state and the Active state to a second state among the Idle State, the Periodic Idle state and the Active state, in which the first and second states are different, based on the determined use case and the determined state of the RF transmitter in the at least one modem.

6. The method of claim 3, wherein the at least one modem includes a plurality of modems,
   wherein each modem of the plurality of modems which has a maximum RF transmit power satisfying a maximum RF transmit power reduction requirement is a category A modem, and
   wherein each modem of the plurality of modems which has a maximum RF transmit power that does not satisfy the RF transmit power reduction requirement is a category B modem, and
   the method further comprising:
   controlling, by the processing device, at least one of
      maintaining the proximity sensor in the Idle State when only a single first modem among the plurality of modems is in an Active modem state and the first modem is a Category A modem,
      maintaining the proximity sensor in the Active State when at least two second modems among the plurality of modems is in the Active modem state and each of the second modems is a Category A modem,
      maintaining the proximity sensor in the Active State when at least one third modem among the plurality of modems is in the Active state and each of the at least one third modem is a Category B modem, or
      maintaining the proximity sensor in the Active State when a fourth modem among the plurality of modems transitions to the Active state when at least one fifth modem among the plurality of modems is in the Active state, wherein the fourth modem is a Category A modem and the at least one fifth modem is a Category B modem.

7. The method of claim 3, further comprising:
   controlling, by the processing device, maintaining the proximity sensor in the Idle state when the at least one modem is in the Active state and total RF transmitter power for all of the at least one modem is below a predetermined value.

8. The method of claim 3, further comprising:
controlling, by the processing device, transitioning the proximity sensor to the Active state or the Periodic Idle state when RF transmitter power to be used for RF transmission at the at least one modem is determined to be in a range where RF power reduction control is required.

9. The method of claim 3, further comprising:
controlling, by the processing device, updating a current state of the proximity sensor when a power control command is received from a network for any of the at least one modem.

10. The method of claim 9, further comprising:
controlling, by the processing device, when the power control command is to increase a current transmit power level to a new transmit power level, comparing the new transmit power level with a predetermined threshold for determining whether to change the current state of the proximity sensor.

11. The method of claim 3, further comprising:
controlling, by the processing device, evaluating a current state of the proximity sensor when a Timing Advance command indicating a change to transmit power level is received from a network for any of the at least one modem.

12. The method of claim 3, further comprising:
controlling, by the processing device, transitioning the proximity sensor to the Periodic Idle state for scanning at a lowest scanning rate among scanning rates of the Periodic Idle state, when a determination is a voice call over a Wireless Wide-Area Network (WWAN) is routed to the wireless communication device over a Bluetooth communication link.

13. The method of claim 3, further comprising:
controlling, by the processing device, when the wireless communication device is tethered by a cable to another device, determining whether to transition the proximity sensor from a current state based on a first predetermined RF maximum power threshold different from a second predetermined RF maximum power threshold corresponding to a first use case among the use cases associated with RF transmission by the RF transmitter in the at least one modem.

14. The method of claim 13, wherein the another device is a computer or headset.

15. The method of claim 3, further comprising:
controlling, by the processing device, when the wireless communication device is in a voice call and using a speakerphone mode, determining whether to transition the proximity sensor from a current state based on a first predetermined RF maximum power threshold different from a second predetermined RF maximum power threshold corresponding to a first use case among the use cases associated with RF transmission by the RF transmitter in the at least one modem.

16. The method of claim 1, further comprising:
controlling, by the processing device, when during the Periodic Idle state the user of the wireless communication device is determined not to be proximate to the wireless communication device, transitioning of the proximity sensor to an Active state, and starting periodic scanning at the proximity sensor at a new rate, wherein the new rate is greater than an old rate at which scanning is performed by the proximity sensor during the Periodic Idle state when the user of the wireless communication device is determined to be proximate to the wireless communication device.

17. An apparatus for proximity sensor control at a wireless communication device, the apparatus comprising:
circuitry configured to control, at the wireless communication device,
maintaining a proximity sensor of the wireless communication device in a Periodic Idle state, in which for each given rate of scanning by the proximity sensor in the Periodic Idle state, the proximity sensor is in an Active scan state for a first given duration less than a predetermined duration and autonomously returns to an Idle non-scan state having a second given duration; and
transitioning, within the Periodic Idle state, from a first rate of scanning by the proximity sensor to a second rate of scanning by the proximity sensor, based on a determination that a user continues to be proximate the wireless communication device,
in which the first rate of scanning has an Active scan state periodicity of a first time length, the second rate of scanning has an Active scan state periodicity of a second time length and the second time length is greater than the first time length,
controlling, by the circuitry, when during the Periodic Idle state the user of the wireless communication device is determined to be proximate to the wireless communication device after a predetermined number of scans by the proximity sensor at the second rate, reducing a current rate of scanning by the proximity sensor from the second rate to a third rate, and
controlling, by the circuitry, during the Periodic Idle state, for a predetermined number times that the user of the wireless communication device is determined to be proximate to the wireless communication device after a predetermined number of scans by the proximity sensor at the current rate, reducing the current rate to another rate lower than the current rate.

18. A wireless communication device comprising:
a receiver to receive a wireless communication; and
a processing device configured for proximity sensor control,
wherein the processing device is configured to control:
maintaining a proximity sensor of the wireless communication device in a Periodic Idle state, in which for each given rate of scanning by the proximity sensor in the Periodic Idle state, the proximity sensor is in an Active scan state for a first given duration less than a predetermined duration and autonomously returns to an Idle non-scan state having a second given duration; and
transitioning, within the Periodic Idle state, from a first rate of scanning by the proximity sensor to a second rate of scanning by the proximity sensor, based on a determination that a user continues to be proximate the wireless communication device,
in which the first rate of scanning has an Active scan state periodicity of a first time length, the second rate of scanning has an Active scan state periodicity of a second time length and the second time length is greater than the first time length,
wherein the processing device is configured to control, when during the Periodic Idle state the user of the wireless communication device is determined to be proximate to the wireless communication device after a predetermined number of scans by the proximity sensor at the second rate, reducing a current rate of scanning by the proximity sensor from the second rate to a third rate, and wherein the processing device is configured to control, during the Periodic Idle state, for a predetermined number times that the user of the wireless communication device is determined to be proximate to the wireless communication device after a predetermined number of scans by the proximity sensor at the current rate, reducing the current rate to another rate lower than the current rate.

* * * * *